(12) United States Patent
Polegato Moretti

(10) Patent No.: US 8,910,353 B2
(45) Date of Patent: Dec. 16, 2014

(54) LOCKING DEVICE FOR LACES, SHOELACES, CORDS AND THE LIKE, PARTICULARLY ADAPTED TO CLOSE SHOES, RUCKSACKS, ITEMS OF CLOTHING AND THE LIKE

(75) Inventor: Mario Polegato Moretti, Crocetta del Montello (IT)

(73) Assignee: GEOX S.p.A., Montebelluna (IT)

(*) Notice: Subject to any disclaimer, the term of this patent is extended or adjusted under 35 U.S.C. 154(b) by 0 days.

(21) Appl. No.: 13/991,366

(22) PCT Filed: Nov. 17, 2011

(86) PCT No.: PCT/EP2011/070316
§ 371 (c)(1),
(2), (4) Date: Jun. 12, 2013

(87) PCT Pub. No.: WO2012/072421
PCT Pub. Date: Jun. 7, 2012

(65) Prior Publication Data
US 2013/0263413 A1  Oct. 10, 2013

(30) Foreign Application Priority Data

Dec. 3, 2010  (IT) .............................. PD2010A0369

(51) Int. Cl.
| | |
|---|---|
| A43C 9/06 | (2006.01) |
| A43C 7/08 | (2006.01) |
| A43C 7/04 | (2006.01) |
| F16G 11/10 | (2006.01) |

(52) U.S. Cl.
CPC ... *A43C 7/08* (2013.01); *A43C 7/04* (2013.01); *F16G 11/101* (2013.01)
USPC ......................................................... 24/713

(58) Field of Classification Search
USPC ........ 24/132 R, 132 AA, 712.1, 712.2, 712.5, 24/712.6, 712.9
See application file for complete search history.

(56) References Cited

U.S. PATENT DOCUMENTS

| 819,884 A | 5/1906 | Higgins |
|---|---|---|
| 2,547,370 A | 4/1951 | Boyer |

(Continued)

FOREIGN PATENT DOCUMENTS

| JP | 5 34905 | 5/1993 |
|---|---|---|
| WO | 2006 138170 | 12/2006 |

OTHER PUBLICATIONS

International Search Report Issued Feb. 13, 2012 in PCT/EP11/070316 filed Nov. 17, 2011.

(Continued)

*Primary Examiner* — Robert J Sandy
*Assistant Examiner* — Matthew Sullivan
(74) *Attorney, Agent, or Firm* — Oblon, Spivak, McClelland, Maier & Neustadt, L.L.P.

(57) ABSTRACT

A locking device for laces, shoelaces, cords and the like, including: a base configured to be fixed to a product including the lace to be locked and including at least one seat for passage of a lace to be locked; a lever including at least one element for pinching the lace in the passage seat, and at least one guiding seat for the lace; the lever being connected to the base, proximate to the passage seat, by a pivot, the pinching element engaging the passage seat so as to pinch thereat the lace to prevent its sliding in the passage seat, an end portion of the lace passing through the at least one guiding seat to be directed in a preselected reverse direction, which is defined by the at least one guiding seat, and vice versa.

8 Claims, 3 Drawing Sheets

(56) References Cited

U.S. PATENT DOCUMENTS

| | | | |
|---|---|---|---|
| 3,057,029 A * | 10/1962 | Miller, Jr. et al. | 24/712.6 |
| 6,339,867 B1 * | 1/2002 | Azam | 24/712.5 |
| 2003/0070268 A1 * | 4/2003 | Ross | 24/712.1 |
| 2004/0172796 A1 * | 9/2004 | King, Jr. | 24/712.5 |
| 2004/0250388 A1 * | 12/2004 | Martin | 24/712.5 |
| 2005/0034281 A1 * | 2/2005 | Shiue | 24/132 R |
| 2006/0053601 A1 * | 3/2006 | Taylor | 24/712.1 |
| 2007/0000105 A1 * | 1/2007 | Grande et al. | 24/712.5 |
| 2013/0160256 A1 * | 6/2013 | Waldman et al. | 24/712.6 |

OTHER PUBLICATIONS

Italian Search Report Issued Jul. 12, 2013 in Italian Patent Application No. PD2010A 000369 filed Dec. 3, 2010.

* cited by examiner

LOCKING DEVICE FOR LACES, SHOELACES, CORDS AND THE LIKE, PARTICULARLY ADAPTED TO CLOSE SHOES, RUCKSACKS, ITEMS OF CLOTHING AND THE LIKE

TECHNICAL FIELD

The present invention relates to a locking device for laces, shoelaces, cords and the like, particularly adapted to close shoes, rucksacks, items of clothing and the like.

BACKGROUND ART

In the shoe industry, conventional lacing currently entails that the upper has a top longitudinal opening under which a tongue is arranged.

The flaps of the opening have a plurality of eyelets, or hooks or shoe loop hooks for the passage of a lace.

The lace is inserted in an alternated manner through the eyelets or hooks, first of one flap and then of the other one, and then the free ends are located at the foot insertion opening.

Thus, pulling the ends of the lace tends to close the flaps toward each other, tightening the shoe around the foot of the user.

In order to keep the shoe tight in this manner, the ends of the lace are usually tied to each other.

The widely known drawbacks of this fastening solution consist in that it requires the use of both hands to lock the laces by means of a knot and the widespread need to provide a knot that is easy to loosen, in order to facilitate the loosening of the fastening action of the shoe, for example if it has to be removed from the foot of the user.

Moreover, during use of the shoe, the knot, particularly if it is easy to undo, tends to loosen, fully to the disadvantage of the comfort and effectiveness of the fit.

Vice versa, an excessive tension applied to the lace and to the knot may cause an undesired and unpleasant pressure on the foot.

Moreover, lacing solutions are known which use clips or chokers that allow quick fastening by traction and subsequent reversible locking of the laces.

U.S. Pat. No. 3,564,670, for example, discloses a lace locking device according to which the two ends of the lace are threaded through a one-way device by choking.

In this device, the free ends of the lace are threaded through a diverging channel in which a perimetrically toothed wheel is accommodated.

The wheel is supported so that it can slide along a guide that is longitudinal to the channel.

Each lace passes between a side of the wheel and a wall of the channel.

The wheel can be moved along the sliding seat toward the exit of the channel, which has a wider opening, in order to allow the sliding of the laces to loosen the lacing, or toward the entrance of the channel, in order to choke them against the walls, preventing their disengagement in order to keep the lacing fastened.

Such devices ensure constant lacing and obviate the problem of the loosening and unfastening of knotted lacings.

However, although such devices are appreciated, they suffer considerable drawbacks, particularly when used in sports shoes.

The lace, once it has been tightened and tensioned, in fact has a residual portion that remains loose beyond the clip or locking device.

This loose portion is considered an important hindrance and is also a source of danger for the user because it might catch in a foreign object while walking or, worse still, during the practice of a sports activity.

Moreover, the protrusion of the loose portion of the lace from the shoe is poorly appreciated in terms of the esthetic contribution that it provides.

Currently, solutions are known which are intended to allow the concealment of this loose portion of the lace.

In these solutions generally a pocket is provided, for example defined on the end of the tongue, where the loose portion of the lace beyond the locking device or the clip is accommodated.

U.S. Pat. No. 6,473,999, for example, discloses a shoe in which a hood-like lace storing pocket open toward the locking device is provided on the upper portion of the tongue.

In this case the clip, or the locking device, and the loose portion of the lace may both be covered by the hood-like pocket that accommodates them during use of the shoe.

Moreover, US2006/0000116 discloses a device that is adapted to hold a shoe to the foot of the user.

Such device comprises a shaped plate that overlaps the portion of the upper that is adapted to cover the metatarsal region of the foot of the user.

A lace is anchored to the tip of the shoe and guided through passages provided in the plate and d-ring or hooks provided on the side of the upper.

The loose ends of the lace are guided at the front edge of the foot insertion opening by means of a clip which is fixed to the upper, which comprises thereat a pocket adapted to accommodate, by hiding them, the lace and the clip.

Such solutions lead to products that are uncomfortable in use, because of the bulk of the pocket filled with the ends of the lace and with the clip or locking device, and are heavy.

Moreover, positioning of the lace and of the clip or locking device in the pocket is laborious and further generally requires two hands in order to be performed.

Use is even more difficult if the user wears gloves that hamper the handling of the device.

Likewise, there are devices provided with a device for winding the lace which is arranged generally behind the heel region of the shoe.

Such devices, though allowing to avoid loose lace portions that protrude from the shoe, allowing effective storage of the lace, however are extremely complex and require numerous rotations of the lace winding spool in order to obtain a satisfactory lacing.

DISCLOSURE OF THE INVENTION

The aim of the present invention is to provide a locking device for laces, shoelaces, cords and the like that allows to overcome the drawbacks described above and allows in particular to obtain an effective retention of laces, even under tension, avoiding their loosening.

Within this aim, an object of the invention is to devise a locking device that can be operated easily and effectively even with a single hand, in order to lock or release laces under tension or the like.

Another object of the invention is to provide a locking device that allows a better integration of the remaining portion of the lace, or the like, in the esthetic profile of shoes, rucksacks, or items of clothing and the like that are provided with it.

Another object of the invention is to provide a locking device for laces and the like that allows easy replacement of the lace, or the like, that it is adapted to lock.

Yet another object of the invention is to devise a locking device that is structurally simple and easy to use and can be manufactured with relatively low costs.

This aim and these and other objects that will become better apparent hereinafter are achieved by a locking device for laces, shoelaces, cords and the like, particularly adapted to close shoes, rucksacks, items of clothing and the like, characterized in that it comprises a base, which is adapted to be fixed to the product provided with the lace to be locked and is provided with at least one seat for the passage of a lace to be locked, a lever, which has at least one element for pinching said lace in said at least one passage seat, and at least one guiding seat for said lace, said lever being connected to said base, proximate to said at least one passage seat, by pivoting means which define for it a rotation axis, around which said lever is able to rotate with respect to said base in order to pass reversibly from an open configuration, in which said at least one passage seat is free from said at least one pinching element, said lace passing through and being able to slide freely within said at least one passage seat, to a closure configuration, in which said lever is folded down onto said base, said at least one pinching element engaging said at least one passage seat so as to pinch thereat said lace in order to prevent its sliding in said at least one passage seat, an end portion of said lace passing through said at least one guiding seat to be directed in a preselected reverse direction, which is defined by said at least one guiding seat, and vice versa.

BRIEF DESCRIPTION OF THE DRAWINGS

Further characteristics and advantages of the invention will become better apparent from the description of a preferred but not exclusive embodiment of the locking device according to the invention, illustrated by way of non-limiting example in the accompanying drawings, wherein.

WAYS OF CARRYING OUT THE INVENTION

Figure 1:
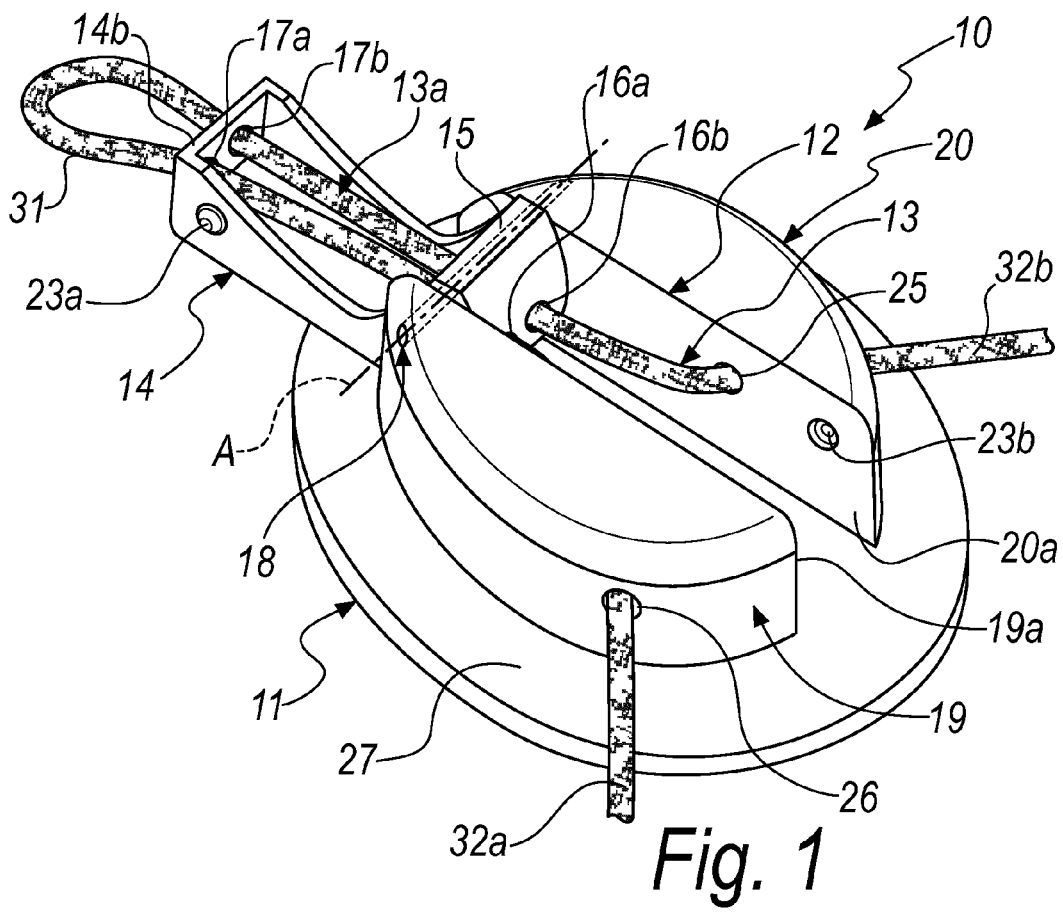
FIG. 1 is a perspective view of a locking device according to the invention.
Figure 2:
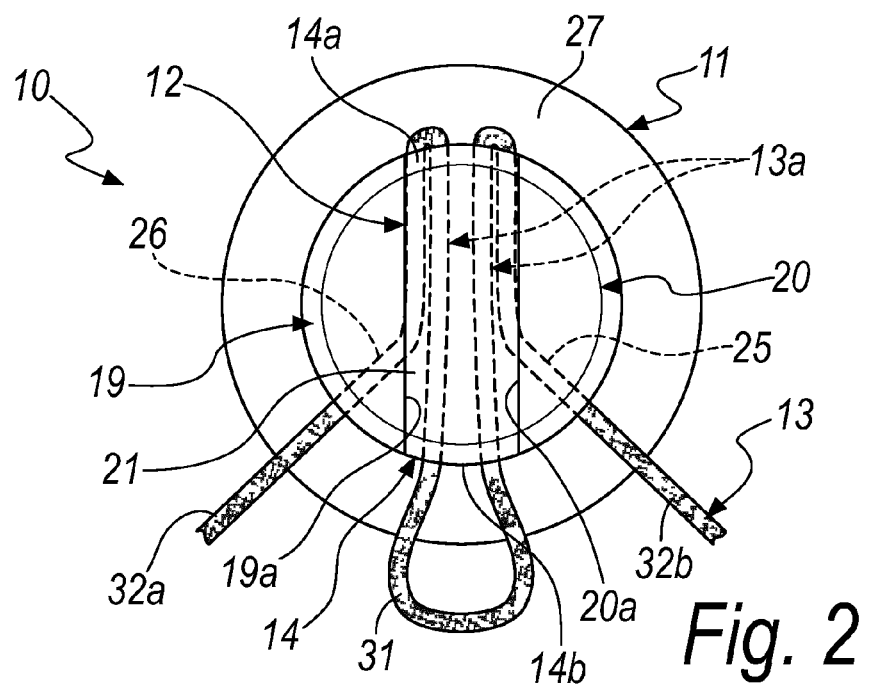
FIG. 2 is a top plan view of a locking device according to the invention.

With reference to the figures, the reference numeral 10 generally designates a locking device for laces, shoelaces, cords and the like, particularly adapted to close shoes, rucksacks, items of clothing and the like, which according to the invention has a peculiarity in that it comprises a base 11, which is adapted to be fixed to the product provided with the lace to be locked and is provided with a passage seat 12 for a lace 13 to be locked, a lever 14, which has an element 15 for pinching the lace 13 in the passage seat 12, and guiding seats 16a, 16b, 17a and 17b for the lace 13.

Figure 3:
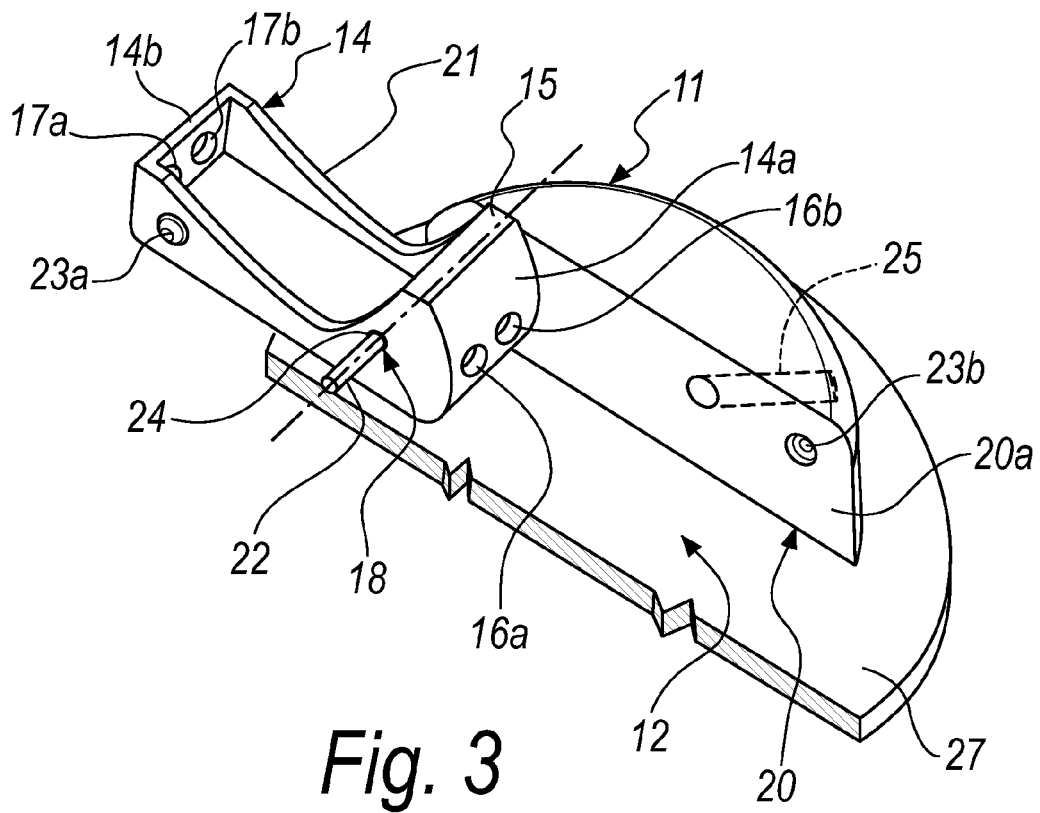
FIG. 3 is a partially sectional perspective view of a locking device according to the invention.

According to the invention, the lever 14 is connected to the base 11, proximate to the passage seat 12, by pivoting means 18 which define for the lever 14 a rotation axis A around which it is able to rotate with respect to the base 11 in order to pass reversibly from an open configuration, in which the passage seat 12 is free from the pinching element 15, the lace 13 passing through and being able to slide freely within the passage seat 12, as illustrated by way of non-limiting example in FIGS. 1 and 3, to a closure configuration, in which the lever 14 is folded down onto the base 11, the pinching element 15 engaging the passage seat 12 substantially so as to obstruct it, so as to pinch thereat the lace 13 in order to prevent its sliding in the passage seat 12, an end portion 13a of the lace 13 passing through the guiding seats 16a, 16b, 17a and 17b to be directed in a preselected reverse direction, which is defined by the guiding seats 16a, 16b, 17a and 17b, and vice versa.

Preferably, the pinching element 15 has the shape of a tooth and the guiding seats 16a, 16b, 17 and 17b are holes that pass through the thickness of the lever 14.

In alternative and substantially equivalent embodiments of the invention, not described or illustrated further herein, according to the contingent requirements, the lever has at least one passage guide for the lace and/or at least one pinching element, the base having at least one passage seat for the lace to be locked.

Moreover, according to the contingent requirements of implementation of the invention, the base and the lever may be provided in a single piece, for example made of plastics, and connected by means of a flexible hinging portion that defines said pivoting means.

Advantageously, the base 11 has two side walls 19 and 20, which delimit laterally the passage seat 12, which is substantially shaped like a channel in order to receive and accommodate the arm 21 of the lever 14 when the lever 14 is in said closure configuration.

The pivoting means 18 preferably comprise a pivot 22, which passes through a first end 14a of the lever 14 transversely to the walls 19 and 20 that support it, so as to define the rotation axis A substantially transversely to the extension of the passage seat 12 that defines the passage direction of the lace 13 therein.

The pinching element 15 protrudes conveniently from the first end 14a in a direction which is substantially radial to the rotation axis A.

Advantageously, the locking device 10 comprises means for retaining the lever 14 in said closure configuration, which comprise conveniently teeth 23a, which protrude laterally from the lever 14, and receptacles 23b, which are provided correspondingly on the inner faces 19a and 20a of the walls 19 and 20 and are adapted to receive the teeth 23a when the lever 14 is in said closure configuration, in order to retain it thereat.

The guiding seats 16a, 16b, 17a and 17b comprise conveniently first guiding seats 16a and 16b that pass through the first end 14a in a direction which is substantially longitudinal to the lever 14.

Moreover, the lever 14 has the transverse passage hole 24 for the pivot 22, in a region which is intermediate between the pinching element 15 and the first guiding seats 16a and 16b.

Advantageously, moreover, the guiding seats 16a, 16b, 17a and 17b comprise second guiding seats 17a and 17b, which are open so as to pass through the second end 14b of the lever 14, which is opposite with respect to the first end 14a.

Preferably, moreover, guiding holes 25 and 26 for the lace 13 are provided which pass through the walls 19 and 20 and are open onto the passage seat 12 in order to accommodate the lace 13 thereat.

In general, in alternative embodiments of the invention at least one guiding hole is provided, which moreover may be replaced in an equivalent manner by at least one seat adapted to the contingent requirements and shaped for example like channels or grooves provided in at least one of the walls of the base.

Moreover, the base 11, advantageously has a flange 27 for connection to a product equipped with the lace 13 to be locked.

In a preferred but not exclusive method of use of the locking device 10, said product is a shoe 28.

In this case, the locking device 10 is fixed to the tongue 29, preferably at the end thereof that is proximate to the foot insertion opening 30.

In particular, the flange 27 is advantageously stitched to the tongue 29.

Figure 6:
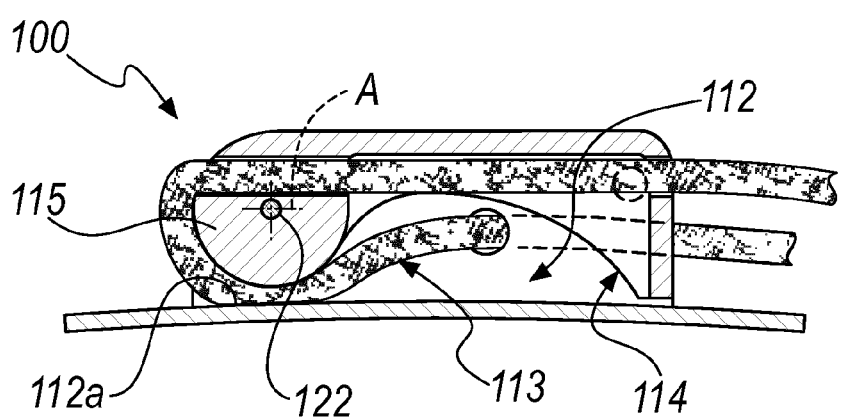
FIG. 6 is a transverse sectional view of a locking device according to the invention in a constructive variation.

With reference to FIG. 6, said figure illustrates by way of non-limiting example a locking device 100 according to a constructive variation of the invention.

The pinching element 115 conveniently has an outer surface with a substantially cylindrical extension, coaxial to the pivot 122, the axis of which defines the rotation axis A.

In this manner, during the rotation of the lever 114 about the rotation axis A for the passage from said open configuration to said closure configuration, the lace 113 is drawn into the seat 112 between the bottom 112a and the pinching element 115 and is locked.

Operation of a locking device, according to the invention, is as follows.

In order to put under tension the lace 13, for example in order to fasten a shoe 28 or the opening of a rucksack or of an item of clothing, not shown in the accompanying figures, the user pulls one loose end 31 thereof, which protrudes from the second end 14b of the lever, which is arranged in said open configuration.

Said loose end, which in the embodiment illustrated herein by way of non-limiting example defines a d-ring, can be constituted, however, in an equivalent manner, by a pair of terminals or by a single terminal, the second terminal being for example fixed to the product or engaged in a further provided locking device according to the invention.

Thus, the pulled lace 13 slides through the guiding holes 25 and 26, through the passage seat 12 and through the guiding seats 16a, 16b, 17a and 17b, tensioning toward the base 11 the active portions 32a and 32b of the lace 13, which are external to the locking device 10, which is interposed, along the lace 13, between said portions and the loose end 31.

In order to maintain the tension of the active portions 32a and 32b, the user turns the lever 14 around the rotation axis A, bringing it to said closure configuration.

Figure 4:
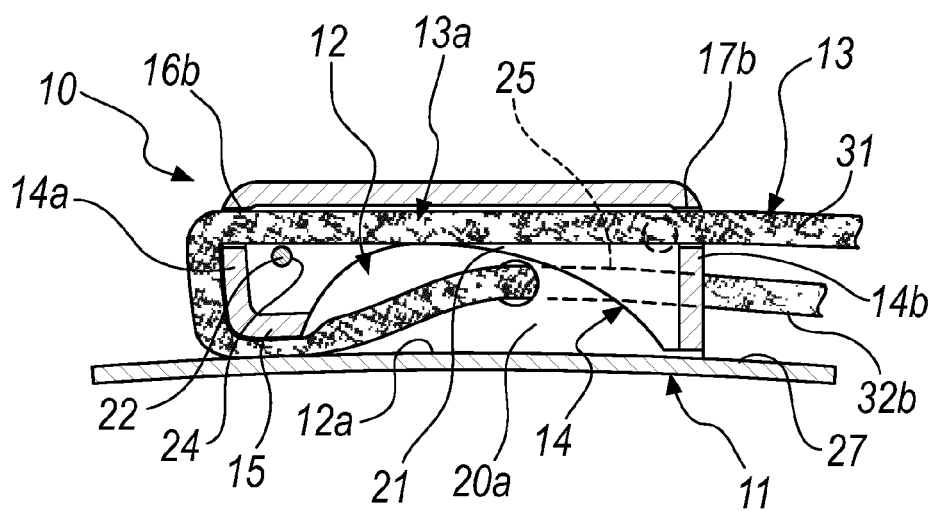
FIG. 4 is a transverse sectional view of a locking device according to the invention.

In particular, in the rotation of the lever 14 in order to move it from said open configuration to said closure configuration, the lace is partially wound on the pinching element 15 and is pinched between the latter and the bottom 12a of the seat 12, as shown by way of non-limiting example in FIG. 4.

In said closure configuration, the loose end 31 of the lace 13 is directed along the second guiding seats 17a and 17b.

Figure 5:
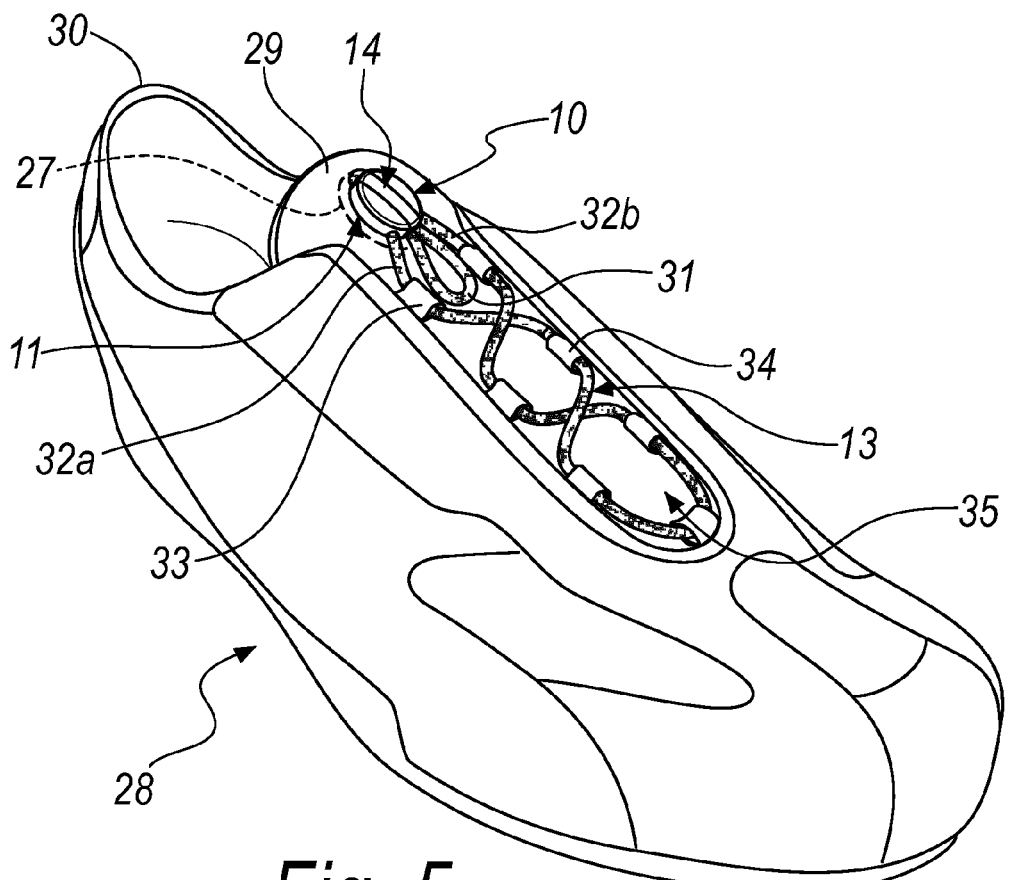
FIG. 5 is a perspective view of a shoe that comprises a locking device according to the invention.

Thus, with reference to FIG. 5 in said preferred method of use, the guiding holes 25 and 26 are provided through the walls 19 and 20 in the direction of the first eyelets 33 and 34 of the lacing region 35.

Moreover, the locking device 10 is fixed to the tongue 29 so that the second seats 17a and 17b are directed toward the lacing region 35 when the lever 14 is in said closure configuration.

In this manner, in this configuration, the loose end 31 of the lace 13 is directed toward the lacing region 35 and thus is in such a position as to not hinder the user during use of the shoe 28 and moreover is not exposed with respect to the volume of the shoe 28, fully to the advantage of safety in its use.

In order to release the tension of the lace 13 tensioned and locked as explained so far, the operator lifts the lever 14 by turning it with respect to the base 11, bringing it to said open configuration.

Thus, the pinching element 15 gradually releases the lace 13 in the seat 12, which is again free to slide inside it and can therefore be loosened, or further or again tensioned.

The locking device 10, moreover, is particularly advantageous to use if the lace 13 is of the composite type, with the loose end 31 made of elastic material and thus capable of contracting elastically when it is not pulled to tighten the lace 13.

Moreover, an advantageous refinement, not shown in the accompanying figures or further described, consists in providing a magnetically active or reactive element integrated in the loose end 31 of the lace 13, or connected thereto, a magnetically reactive or active complementary element integrated in the tongue 29, or connected thereto, being provided in a position that corresponds to a resting region of the loose end 31 of the lace 13, in order to retain it by magnetic interaction when the locking device 10 is in said closure configuration.

In practice, it has been found that the invention achieves the intended aim and objects by providing a locking device for laces, shoelaces, cords and the like, that allows to overcome the described drawbacks and allows in particular to obtain an efficient retention of laces, even under tension, avoiding their loosening, by way of the effective retention provided by the pinching element that pinches the lace against the bottom of the passage seat.

A locking device according to the invention, moreover, can be actuated easily and effectively even with a single hand, in order to lock or release laces under tension; in fact the user can, with one hand, pull the loose end of the lace from the lever, in order to tension the lace, and then, with the same hand, turn the lever, bringing it to the closure configuration in order to maintain the set tension.

Moreover, a locking device according to the invention allows easy replacement of the lace or the like that it is adapted to lock; it is in fact sufficient to extract from the guiding holes and from the guiding seats the lace to be replaced and to thread therein the replacement lace.

A locking device according to the invention also allows to direct in a preset manner the loose end of the lace that protrudes from the locking device, said loose end being directed along to the preset direction of the second guiding seats.

In this manner, the locking device keeps the lace, or the like, snugly against the lacing region and folded back onto it, without altering the esthetic appearance of the product that is provided with it, be it a shoe, a rucksack or an item of clothing and the like.

Moreover, a locking device according to the invention is structurally simple and easy to use and can be manufactured with relatively low costs.

The invention thus conceived is susceptible of numerous modifications and variations, all of which are within the scope of the appended claims; all the details may further be replaced with other technically equivalent elements.

In practice, the materials used, so long as they are compatible with the specific use, as well as the contingent shapes and dimensions, may be any according to requirements and to the state of the art.

The disclosures in Italian Patent Application No. PD2010A000369 from which this application claims priority are incorporated herein by reference.

The invention claimed is:

1. A locking device for a lace or cord, comprising:
    a base configured to be fixed to a product including the lace or cord to be locked and including at least one passage seat for passage of the lace or cord to be locked;
    a lever including at least one element for pinching the lace or cord in the at least one passage seat, and at least one guiding seat for the lace or cord;
    the lever being connected to the base, proximate to the at least one passage seat, by pivoting means that define for it a rotation axis, around which the lever is configured to rotate with respect to the base to pass reversibly:
        from an open configuration, in which the at least one passage seat is free from the at least one pinching element, the lace or cord passing through and configured to slide freely within the at least one passage seat,
        to a closure configuration, in which the lever is folded down onto the base, the at least one pinching element engaging the at least one passage seat so as to pinch thereat the lace or cord to prevent sliding in the at least one passage seat, an end portion of the lace or cord passing through the at least one guiding seat to be directed in a preselected reverse direction, which is defined by the at least one guiding seat,
        and vice versa,
    wherein the base includes two side walls, which delimit laterally the at least one passage seat, which is substantially shaped like a channel to receive and accommodate an arm of the lever when the lever is in the closure configuration,
    wherein the pivoting means comprises a pivot that passes through a first end of the lever transversely to the side walls that support it, so as to define the rotation axis substantially transverse to the passage direction of the lace or cord in the at least one passage seat, which is defined by an extension of the passage seat, and
    wherein the at least one guiding seat comprises at least one first guiding seat that passes through the first end in a direction substantially longitudinal to the lever.

2. The locking device according to claim 1, wherein the at least one pinching element protrudes from the first end in a direction substantially radial to the rotation axis.

3. The locking device according to claim 1, further comprising means for retaining the lever in the closure configuration.

4. The locking device according to claim 3, wherein the retention means comprises:
    teeth that protrude laterally with respect to the lever, and
    receptacles provided correspondingly on inner faces of side walls and configured to receive the teeth when the lever is in the closure configuration, to retain it thereat.

5. The locking device according to claim 1, wherein the lever includes a transverse passage hole for the pivot, in a region intermediate between the at least one pinching element and the at least one first guiding seat.

6. The locking device according claim 1, wherein the at least one guiding seat comprises at least one second guiding seat, which is open so as to pass through the second end of the lever, which is opposite with respect to the first end.

7. The locking device according to claim 1, comprising at least one guiding hole for the lace or cord that passes through at least one of the side walls and is open onto the at least one passage seat to accommodate the lace therein.

8. The locking device according to claim 1, wherein the base includes a flange for connection to a product including the lace or cord to be locked.

* * * * *